United States Patent Office 3,377,359
Patented Apr. 9, 1968

3,377,359
AMINO DERIVATIVES, COMPRISING HETERO-CYCLES, THEIR SALTS, AND PROCESS FOR PREPARATION
Jacques Robert Boissier, Paris, and Roger Robert Etienne Eugene Ratouis, Saint-Cloud, France, assignors to Societe Industrielle pour la Fabrication des Antibiotiques (S.I.F.A.), Paris, France, a company of France
No Drawing. Filed Jan. 6, 1965, Ser. No. 423,863
Claims priority, application France, Jan. 15, 1964, 960,417; Apr. 15, 1964, 971,004; Mar. 19, 1964, 967,916; June 17, 1964, 978,621
9 Claims. (Cl. 260—329)

This invention relates to new substituted furyl-methylamines and thienyl-methylamines, the salts of these substituted compounds, and also to the process for the preparation thereof. These compounds have proved to be very useful for human therapeutic purposes, particularly as anorexigenic substances.

The present invention provides compounds of the general formula

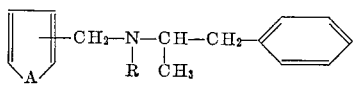

(1)

in which A represents an oxygen or sulphur atom and R represents a hydrogen atom or a linear or branched alkyl radical containing at the most 3 carbon atoms.

These new compounds have an asymmetrical carbon atom and the compounds of the invention can be in dextrorotatory, levorotatory or racemic isomeric form.

The compounds of general Formula 1 have a basic character and so they can form addition salts with inorganic or organic acids.

The new compounds of general Formula 1 can be prepared by first of all reacting an aldehyde of the general formula:

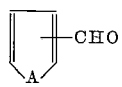

(2)

(in which A has the meaning indicated above) with dextrorotatory, levorotatory or racemic 1-phenyl-2-aminopropane, then saturating with hydrogen the double bond carried by the nitrogen atom of the imine of the general formula:

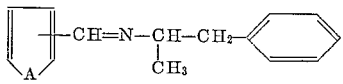

(3)

and eventually, if it is desired to obtain derivatives of the general Formula 1 in which R is not hydrogen, alkylating the compound which is obtained, for example, by treating with a mixture of formic acid and an aliphatic aldehyde or with a halide of formula X—R in which X is a halogen atom.

In a preferred method of carrying out the process, the following procedure is used:

(a) In the first stage, substantially equimolecular quantities of the aldehyde of general Formula 2 and of 1-phenyl-2-aminopropane are used and the reaction takes place in methanol or ethanol at ambient temperature.

It is then possible to isolate the imine of general Formula 3 which is obtained, by rectification of the alcoholic solution, but it is also possible to use it in the form in which it is obtained in solution for the following stage.

(b) The hydrogenation of the imine of Formula 3 is advantageously effected either by direct action of the hydrogen in the presence of a usual hydrogenation catalyst, or by the action of an alkali metal borohydride.

In the first case, the hydrogenation takes place in an organic solvent, which may be methanol or ethanol, optionally from the first stage, and consequently without it being necessary to isolate the imine of general Formula 3; it is also possible for example to operate in dioxane. The solution is stirred in a hydrogen atmosphere at ambient pressure and temperature in the presence of hydrogenation catalysts (such as the platinum prepared according to Adams, Raney nickel or palladium deposited on carbon). When the theoretical quantity of hydrogen has been absorbed, the catalyst is separated by filtration and the derivative of general Formula 1 is isolated by concentration and purified.

In the second case, that is to say, when the hydrogenation is carried out by means of an alkali metal borohydride, potassium or sodium borohydride is added gradually to a solution of the imine of general Formula 3 in an alcohol of low molecular weight. Then, after the reaction the desired compound formed is isolated by extraction, concentration and purification.

(c) The alkylation of the substance obtained (which alkylation is necessary when it is desired to obtain a compound of general Formula 1 in which R is an alkyl radical containing up to 3 carbon atoms) advantageously is carried out in one or other of the following ways:

(1) A reductive alkylation can be carried out by means of formic acid and an aliphatic aldehyde having the same number of carbon atoms as the radical R which it is desired to be introduced. In this case, the furyl- or thienyl-methylamine of the general Formula 1, obtained in the preceding stage by hydrogenation of the imine of Formula 3, is mixed with an excess of formic acid, the solution of amine formate thus obtained is treated with a molecular quantity of aldehyde equal to that of the furyl- or thienyl-methylamine used, then the reaction mixture is brought to a temperature of 100–110° C. and the desired compound is isolated.

(2) The alkylation may also be carried out by processes known per se by treatment with an alkyl halide of formula X—R, in which X is a halogen atom.

The acid addition salts of the compounds of general Formula 1 are prepared by treating these compounds with the corresponding acid, preferably in the presence of a solvent; anhydrous solvents are advantageously used, for example, anhydrous ether, absolute ethanol or acetone.

Throughout this specification and claims, the nomenclature used for the novel compounds of the invention is based on that specified in "Handbook for Chemical Society Authors—1960," published by the Chemical Society, London.

When the new compounds are intended to be used as medicines, preference is given to the acids which permit pharmaceutically acceptable salts to be obtained; to this end, the hydrochloric, hydrobromic, sulphuric, phosphoric, acetic, propionic, fumaric, maleic, succinic, tartaric, benzene-sulphonic, toluene sulphonic, cyclohexyl-sulphamic and cinnamic acids are particularly used.

The toxicological and pharmacological study of the new compounds provided by the invention has shown that they are of great interest, because they are found generally to have little toxicity and are very active, especially as anorexigenic compounds.

It has for example been established that the LD$_{50}$ of D-N-methyl-N-($\alpha$-methyl-$\beta$-phenylethyl) - 2 - furyl-methylamine of the formula

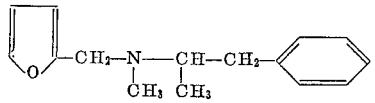

administered intraperitoneally or perorally to a mouse, were respectively 111 mg./kg. and 180 mg./kg. and the LD$_{50}$ of the D-N-methyl-N-($\alpha$-methyl-$\beta$-phenylethyl)-2-furylmethylamine cyclohexyl sulphamate were respectively 195 mg./kg. and 322 mg./kg. under the same conditions. It has also been established that the LD$_{50}$ of the cyclohexyl sulphamates of D - N - methyl-N-($\alpha$-methyl-$\beta$-phenylethyl)-2-thienyl-methylamine of the formula

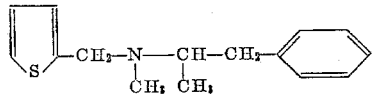

and D - N-methyl-N-($\alpha$-methyl-$\beta$-phenylethyl)-3-thienyl-methylamine administered intraperitoneally to a mouse, were respectively 93 mg./kg. and 210 mg./kg. It is thus seen that these new products have a much lower toxicity than for example amphetamine sulphate, of which the LD$_{50}$, administered intraperitoneally, is from 20 mg./kg. to 30 mg./kg.

Finally, it has been established that the administration of D - N - methyl-N-($\alpha$-methyl-$\beta$-phenylethyl)-2-furyl-methylamine cyclohexyl sulphamate to dogs over a relatively long period (six weeks) and with the daily oral dose per animal of 25 mg./kg. was perfectly tolerated (normal behaviour and biochemical constants), while the anorexigenic activity was preserved.

The pharmacological properties of the new furyl-methylamines and thienyl-methylamines, and their salts, provided by the invention have been found to be extremely interesting, as will be apparent from the different experiments set out below.

The anorexigenic action of D-N-methyl-N-($\alpha$-methyl-$\beta$-phenylethyl)-2-furyl-methyl amine and of its salts has proved to be particularly outstanding. For example, it has been established that when this substance is administered to rats in a dose of 50 mg./kg. perorally, the consumption of food is reduced by approximately 40%. The table given below indicates the details of the results obtained under the following working conditions: In a period prior to the test, the animals were compelled to feed in a feeding trough of a particular type making it possible to avoid wastage and the dispersion of the food, which was a coarsely powdered standard food. The tests are carried out on 12 male rats weighing 250 g. to 300 g. placed in individual cages. The animals were regularly deprived of food from 3:30 p.m. to 9:30 a.m. the following day, the food being offered to them freely from 9:30 a.m. to 3:30 p.m. The drinking water was permanently left available for them. Alternately, for one week, the animals served as comparison animals or were treated. D-N-methyl-N-($\alpha$-methyl-$\beta$-phenylethyl)-2-furyl -methylamine was administered daily at the start of the test in a dose of 50 mg./kg.; it was dissolved at the moment of use by means of dilute acetic acid.

| | Average daily consumption (in g.) per rat in 6 hours | | | Inhibition A−B×100 |
|---|---|---|---|---|
| | A | B | C | A |
| 1st test | 14.2 | 9.0 | 13.2 | 36.6 |
| 2nd test | 12.2 | 6.7 | 13.7 | 45.0 |

A=Week before treatment.

Under the same conditions, the administration of the D - N-methyl-N-($\alpha$-methyl-$\beta$-phenylethyl)-2-furyl-methyl-amine cyclohexyl sulphamate, also to rats, in a dose of 100 mg./kg., led to the following results:

| | Average daily consumption (in g.) per rat in 6 hours | | | Inhibition A−B×100 |
|---|---|---|---|---|
| | A | B | C | A |
| D-N-methyl-N-($\alpha$-methyl-$\beta$-phenylethyl(-2-furyl-methyl-amine cyclohexyl sulphamate | 13.6 | 6.0 | 14.7 | 55 |

B=Week of treatment.

Under the same conditions, the daily administration of either 10 mg./kg. of D-N-methyl-N-($\alpha$-methyl-$\beta$-phenylethyl) - 2 - thienyl-methylamine or 100 mg/kg. of D-N-methyl - N - ($\alpha$-methyl-$\beta$-phenylethyl)-3-thienyl-methyl-amine cyclohexylsulphamates, these doses being administered daily at the moment when the food is offered, gave the results indicated below:

| | Average daily consumption (in g.) per rat in 6 hours | | | Inhibition A−B×100 |
|---|---|---|---|---|
| | A | B | C | A |
| D-N-methyl-N-($\alpha$-methyl-$\beta$-phenylethyl)-2-thienyl-methyl-amine cyclohexyl sulphamate, 10 mg./kg | 12.0 | 8.0 | 13.6 | 33.3 |
| D-N-methyl-N-($\alpha$-methyl-$\beta$-phenylethyl)-3-thienyl-methyl amine cyclohexyl sulphamate, 100 mg./kg | 14.7 | 9.7 | 15.5 | 34 |

C=First week after treatment.

The activity of the new furyl-methylamines and thienyl-methylamines, and their salts, provided by the invention has also been investigated in connection with dogs. It has for example been established that the D-N-methyl-N-($\alpha$-methyl-$\beta$-phenylethyl)-2-furyl-methylamine cyclohexyl sulphamate had an anorexigenic activity from the dose of 10 mg./kg. perorally. It was in fact established that dogs, compelled to absorb a food of standardised quality and quantity all usually ate the said food in less than 5 minutes, while those to whom had been administered previously (3 hours) 10 mg./kg. of the said derivative either did not take any food (almost 50% of the animals) or only ate a part of the food which was offered.

Furthermore, it was established that this same substituted furyl-methylamine, namely, D-N-methyl-N-($\alpha$-methyl - $\beta$-phenylethyl)-2-furyl-methylamine, used in the cyclohexyl sulphamate form, had a reduced psychoanaleptic activity. It was for example compared with the amphetamine used in the sulphate form and it was found that 25 mg./kg. of the derivative according to the invention did not counteract in mice the hypnosis of mebubarbital, whereas a dose of 5 mg./kg. of amphetamine was sufficient to cause a very marked antagonism.

In addition, it was established that the ratio of the LD$_{50}$, calculated from tests carried out firstly on isolated animals and secondly on animals in groups was of the order of 1 with this same derivative according to the invention. Under identical conditions, the ratio found with amphetamine is in the region of 7. These results show that this new compound provided by the invention has a weak psychoanaleptic action; actually, it is known that when a substance is capable of stimulating the central nervous system, its LD$_{50}$ in respect of the isolated animal is much higher than its LD$_{50}$ with the animal of a group and that for this reason the ratio of these LD$_{50}$ is very much higher than 1.

Finally, it was observed during tests carried out on an anaesthesised dog that the new compounds provided by the invention are, in the same doses, decidedly less hypertensive than amphetamine (parenteral administration).

On account of these different properties, these new substituted furyl-methylamines and thienyl-methylamines, and their salts are effective for human therapeutics, particularly as anorexigenic medicines. They can for example be used in connection with complaints or illnesses where it is necessary to reduce or control the appetite, e.g., in connection with persons who are overweight or suffering from various forms of obesity.

In using them as medicines, the new furyl-methylamines and thienyl-methylamines can be utilised either in the form of the base, or in the form of pharmaceutically acceptable acid addition salts.

The usual dose varies according to the novel compound being used and the effect which is desired; when administered perorally to a human being, the dose is of the order of 10 mg. to 200 mg. per day.

The present invention is also concerned with the pharmaceutical compositions which comprise, as an active principle, one or more of the furyl-methylamines and thienylmethylamines or the general Formula 1 and/or their pharmaceutically acceptable acid addition salts. These compositions are prepared in such a way as to be capable of being administered through the digestive or parenteral tracts; they may be solid or liquid and be in the pharmaceutical forms currently employed in human medicine; the active principle or principles thereof are associated with various excipients, which are normally employed in these pharmaceutical compositions, as for example talcum, gum arabic, lactose, starch, magnesium stearate, cocoa butter, the aqueous or non-aqueous vehicles, various wetting, dispersing and emulsifying agents or preservatives.

The following non-limiting examples illustrate the invention.

EXAMPLE 1

(1) Preparation of the base

A solution of 48 g. (0.5 mol.) of freshly distilled 2-furfuraldehyde in 100 ml. of absolute ethanol was added to a solution of 67.5 g. (0.5 mol.) of D-1-phenyl-2-aminopropane in 150 ml. of absolute ethanol. After standing for 15 hours at ambient temperature, the ethanol was driven off and the substance is then distilled. 96 g. (90%) of D-N-($\alpha$-methyl-$\beta$-phenylethyl)-N-furfurylidene amine were obtained, this boiling at 107–110° C./0.1 mm. Hg. $n_D^{21}=1.564$.

A solution of 42.6 g. (0.2 mol.) of the above imine in 200 ml. of absolute ethanol was prepared and this solution was added to 2 g. of reduced platinum oxide and stirred with hydrogen at ambient pressure and temperature. When 4,480 ml. (0.2 mol.) of hydrogen had been absorbed, the catalyst was filtered, the ethanol was driven off by concentration in vacuo and the substance was distilled. 36 g. (84%) of D-N-($\alpha$-methyl-$\beta$-phenylethyl)-2-furyl-methylamine were obtained, boiling at 95–98° C./0.1 mm. Hg. $n_D^{21}=1.531$.

(2) Preparation of the salts (a) 4.3 g. (0.02 mol.) of the base were dissolved in 20 ml. of anhydrous ether and 0.02 mol. of dry hydrochloric acid in the form of a solution in anhydrous ether were added. 4.7 g. of D-N-($\alpha$-methyl-$\beta$-phenylethyl)-2-furyl-methylamine hydrochloride were filtered in vacuo, this being recrystallized from ethyl acetate. Melting point: 176–178° C. on a heating stage microscope.

Analysis.—$C_{14}H_{18}ClNO$. Calculated: C, 66.79%; H, 7.20%. Found: C, 67.0%; H, 7.4%.

(b) 4.3 g. (0.02 mol.) of the base were dissolved in 20 ml. of anhydrous ether and 1.2 g. of acetic acid were added. The substance was concentrated to dryness and there were obtained 5.5 g. of D-N-($\alpha$-methyl-$\beta$-phenylethyl)-2-furyl-methylamine acetate, which was recrystallized from isopropyl ether. Melting point: 82–84° C. on a heating stage microscope. $(\alpha)_D^{20}=+22.1°$; (C.=1, water).

Analysis.—$C_{16}H_{21}NO$. Calculated: C, 69.79%; H, 7.69%. Found: C, 69.7%; H, 7.7%.

(c) 4.3 g. (0.02 mol.) of the base were dissolved in 40 ml. of anhydrous ether and 3.6 g. of cyclohexyl sulphamic acid in 15 ml. of absolute ethanol were added. 7 g. of D-N-($\alpha$-methyl-$\beta$-phenylethyl)-2-furyl-methylamine cyclohexyl sulphamate were filtered in vacuo and recrystallised from ethyl acetate. Melting point: 123–125° C. on a heating stage microscope. $(\alpha)_D^{20}=+15.0°$; (C.=1, water).

Analysis.—$C_{20}H_{30}N_2O_4S$. Calculated: C, 60.88; H, 7.67%. Found: C, 61.1%; H, 7.5%.

EXAMPLE 2

(1) Preparation of the base

A mixture of 21.5 g. (0.1 mol.) of D-N-($\alpha$-methyl-$\beta$-phenylethyl)-2-furyl-methylamine obtained for example by the method of operation which has just been described, 9.2 g. (0.2 mol.) of formic acid and 10 ml. (0.1 mol.) of aqueous 30% formol solution was boiled under reflux for 15 hours.

After cooling, 12 ml. of concentrated hydrochloric acid were carefully added, the mixture was concentrated to dryness in vacuo and the oily residue was taken up in 100 ml. of water, made alkaline by adding concentrated sodium hydroxide, extracted with ether, dried, concentrated and distilled. 16 g. (70%) of D-N-methyl-N-($\alpha$-methyl-$\beta$-phenylethyl)-2-furyl - methylamine were obtained, boiling at 103–106° C./0.1 mm. Hg. $n_D^{21}=1.5295$.

Analysis.—$C_{15}H_{19}NO$. Calculated: C, 78.56%; H, 8.35%. Found: C, 78.2%; H, 8.5%.

(2) Preparation of a salt 4.6 g. (0.02 mol.) of the base were dissolved in 20 ml. of anhydrous ether and 3.6 g. of cyclohexyl sulphamic acid in absolute ethanol were added. The mixture was concentrated to dryness and the residue was taken up twice in 50 ml. of anhydrous ether. By filtration in vacuo, there were obtained 7 g. of D-N-methyl-N-($\alpha$-methyl-$\beta$-phenylethyl)-2-furyl-methylamine cyclohexyl sulphamate. Melting point: 84–86° C. on a heating stage microscope. Melting point, after recrystallisation from acetome: 90–92° C. on a heating stage microscope. $(\alpha)_D^{20}=+12.7°$ (C.=1, water).

Analysis.—$C_{21}H_{32}N_2O_4S$. Calculated: C, 61.73%; H, 7.90%. Found: C, 61.4%; H, 8.1%.

EXAMPLE 3

3 g. (0.079 mol.) of pure sodium borohydride were added in portions to a solution, in 100 ml. of methanol, of 21.3 g. (0.1 mol.) of D-N-($\alpha$-methyl-$\beta$-phenylethyl)-N-furfurylidene amine obtained in accordance with the process described in the first paragraph of Example 1. The mixture was stirred for 1 hour at ambient temperature, refluxed for 1 hour, then 100 ml. of water were added and the methanol was driven off in vacuo. Acidification was carefully carried out by adding dilute hydrochloric acid, whereupon the mixture was made alkaline with dilute sodium hydroxide and the D-N-($\alpha$-methyl-$\beta$-phenylethyl)-2-furyl-methylamine was extracted with ether. 16.8 g. (78%) of this base, which boils at 90–92° C./0.05 mm. Hg, $n_D^{21.5}=1.5305$, were obtained by distillation.

EXAMPLE 4

(1) Preparation of the base

A solution of 9.6 g. (0.1 mol.) of freshly distilled 2-furfuraldehyde in 20 ml. of absolute ethanol was added to a solution of 13.5 g. of 1-phenyl-2-aminopropane in 50 ml. of absolute ethanol. After standing for 15 hours at ambient temperature, the ethanol was driven off and then 20 g. (94%) of N-($\alpha$-methyl-$\beta$-phenylethyl)-N-furfurylidene amine were distilled, this boiling at 152° C./10 mm. Hg.

A solution of 18.5 g. (0.087 mol.) of the above imine in 100 ml. of methanol was prepared, to which 3.3 g. (0.087 mol.) of sodium borohydride were added in portions. The mixture was stirred for 1 hour at ambient temperature, refluxed for 1 hour, cooled, 100 ml. of water were added and the methanol was driven off in vacuo. The substance was carefully acidified, extracted with ether, the aqueous phase was made alkaline and the oil which was separated was extracted with ether. It was concentrated and 17 g. (90%) of N-($\alpha$-methyl-$\beta$-phenylethyl)-2-furyl-methylamine were distilled, this boiling at 106–108° C./0.05 mm. Hg.

(2) Preparation of a salt 4.3 g. (0.02 mol.) of the base were dissolved in 20 ml. of anhydrous ether and 1.2 g. of acetic acid were added. The substance was left standing for 15 hours at 0° C. and 4 g. of N-($\alpha$-methyl-$\beta$-phenylethyl)-2-furyl-methylamine acetate were filtered in vacuo, this being recrystallised

7 from isopropyl ether and melting at 78–79° C. on a heating stage microscope.

Analysis.—$C_{16}H_{21}NO_3$. Calculated: C, 69.79%; H, 7.69%. Found: C, 69.3%; H, 7.7%.

EXAMPLE 5

(1) Preparation of the base

Following the working procedure described in Example 2 and starting from 21.5 g. (0.1 mol.) of N-(α-methyl-β-phenylethyl)-2-furyl-methylamine, there were obtained by distillation 18.4 g. (80%) of N-methyl-N-(α-methyl-β-phenylethyl) - 2 - furyl-methylamine, which boiled at 86–88° C./0.1 mm. Hg.

(2) Preparation of a salt

A solution was prepared of 12.6 g. (0.055 mol.) of the above base in 80 ml. of acetone, 8.95 g. (0.05 mol.) of cyclohexyl sulphamic acid were added, the mixture was stirred until dissolution occurred and 300 ml. of anhydrous ether were added. It was left to stand for 15 hours at 0° C. and 20 g. of N-methyl-N-(α-methyl-β-phenylethyl)-2-furyl-methylamine cyclohexyl sulphamate were filtered in vacuo, this being recrystallised from the mixture of acetone and ether and melting at 113–114° C. on a heating stage microscope.

Analysis.—$C_{21}H_{32}N_2O_4S$. Calculated: C, 61.73%; H, 7.90%. Found: C, 61.7%; H, 8.0%.

EXAMPLE 6

(1) Preparation of the base

A solution of 11.2 g. (0.1 mol.) of 2-thiophenecarboxaldehyde in 50 ml. of absolute ethanol was added to a solution of 13.5 g. (0.1 mol.) of D-1-phenyl-2-aminopropane in 50 ml. of absolute ethanol. After standing for 15 hours at ambient temperature, the ethanol was driven off and a solid residue was obtained, which was recrystallised from 50 ml. of heptane. 18 g. (78.5%) of D-N-(α-methyl-β-phenylethyl)-N-2-thienylidene amine were isolated. (Melting point: 47° C. on a microkofler bench.) 3 g. (0.079 mol.) of pure sodium borohydride were added in portions to a solution of 18 g. (0.0785 mol.) of the aforesaid imine in 100 ml. of methanol. The mixture was stirred for 1 hour at ambient temperature, refluxed for one hour, 100 ml. of water were added and the methanol was driven off in vacuo. Acidification was carefully carried out by adding dilute hydrochloric acid, and then the substance was made alkaline with dilute sodium hydroxide and extracted with ether. After having driven off the ether, there were obtained by distillation 16.3 g. (90%) of D-N-(α-methyl-β-phenylethyl)-2-thienyl-methylamine which boiled at 109–110° C./0.1 mm. Hg.

(2) Preparation of a salt 6.6 g. of the aforesaid base were dissolved in 50 ml. of anhydrous ether and 1.7 g. of acetic acid in 50 ml. of anhydrous ether were added. The mixture was left to stand for 15 hours at 0° C. and 6.4 g. of D-N-(α-methyl-β-phenylethyl)-2-thienyl-methylamine acetate were filtered in vacuo, this being recrystallised from 50 ml. of isopropyl ether. (Melting point: 94–96° C. on a microkofler bench.) $(\alpha)_D^{20°}=+32.2°$ (C.=1, water).

Analysis.—$C_{16}H_{21}NO_2S$. Calculated: C, 65.94%; H, 7.26%. Found: C, 66.1%; H, 7.2%.

EXAMPLE 7

(1) Preparation of the base

A mixture of 23.1 g. (0.1 mol.) of D-N-(α-methyl-β-phenylethyl)-2-thienyl-methylamine, 9.2 g. (0.1 mol.) of formic acid and 10 ml. (0.1 mol.) of aqueous 30% formol solution were refluxed for 15 hours.

After cooling, 12 ml. of concentrated hydrochloric acid were carefully added, the substance was concentrated to dryness in vacuo, taken up in 100 ml. of water, made alkaline by adding concentrated sodium hydroxide, extracted with ether, dried, concentrated and distilled. There were obtained 22.3 g. (91%) of D-N - methyl-N-(α-methyl-β-phenylethyl) - 2 - thienyl-methylamine, which boiled at 112–114° C./0.05 mm. Hg.

(2) Preparation of a salt 4.9 g. (0.02 mol.) of the above base were dissolved in 20 ml. of anhydrous ether and 3.58 g. (0.02 mol.) of cyclohexyl sulphamic acid in 5 ml. of absolute ethanol were added. The mixture was left to stand for 15 hours at −10° C. and 8.4 g. of D-N - methyl - N - (α-methyl-β-phenylethyl) - 2 - thienyl-methylamine cyclohexyl sulphamate was filtered in vacuo and recrystallised from 50 ml. of acetone. (Melting point: 123° C. on a microkofler bench.) $(\alpha)_D^{20°}=+25.7°$ (C.=1, water).

Analysis.—$C_{21}H_{32}N_2O_3S_2$. Calculated: C, 59.40%; H, 7.60%. Found: C, 59.6%; H, 7.6%.

EXAMPLE 8

(1) *Preparation of the base*

A solution of 11.2 g. (0.1 mol.) of 3-thiophenecarboxaldehyde in 50 ml. of methanol was added to a solution of 13.5 g. (0.1 mol.) of D-1-phenyl-2-aminopropane in 50 ml. of methanol. The solution was left to stand for 15 hours at ambient temperature and the solution as such was used in the following stage.

3.8 g. (0.1 mol.) of sodium borohydride were added gradually to the above methanolic solution and the reactions were continued as indicated in Example 6. By distillation there were obtained 21 g. (91%) of D-N-(α-methyl - β - phenylethyl) - 3 - thienyl-methylamine, which boiled at 115–117° C./0.1 mm. Hg.

(2) Preparation of a salt

A solution of 1.7 g. of cyclohexyl sulphamic acid in 3 ml. of absolute ethanol was added to the solution of 2.3 g. of the above base in 15 ml. of anhydrous ether. An immediate precipitation was observed. Filtration in vacuo was carried out, the substance was dried and there were obtained 3.5 g. of D-N - (α-methyl - β - phenylethyl) 3-thienyl-methylamine cyclohexyl sulphamate which was recrystallised from 40 ml. of isopropanol (melting point: 165° C. on a microkofler bench). $(\alpha)_D^{20°}=+16.4$ (C.=1, water).

Analysis.—$C_{20}H_{30}N_2O_3S_2$. Calculated: C, 58.50%; H, 7.37%. Found: C, 58.7%; H, 7.0%.

EXAMPLE 9

(1) Preparation of the base

Using the procedure described in Example 7, and starting from 11.55 g. (0.05 mol.) of D-N-(α-methyl-β-phenylethyl)-3-thienyl-methylamine, there were obtained by distillation 10.4 g. (85%) of D-N - methyl - N-(α-methyl-β - phenylethyl) - 3 - thienyl-methylamine, which boiled at 110–112° C./0.05 mm. Hg.

(2) Preparation of a salt

The corresponding cyclohexyl sulphamate was prepared by working in accordance with Example 7 and starting from 8.1 g. of base and 5.7 g. of cyclohexyl sulphamic acid. After standing for 15 hours at −10° C. there were obtained 12.9 g. of D-N - methyl - N - (α-methyl - β-phenylethyl)-3-thienyl-methylamine cyclohexyl sulphamate, which was recrystallised from 200 ml. of acetone. (Melting point: 128–189° C. on a microkofler bench.) $(\alpha)_D^{20°}=+14.1°$; (C.=1, water).

Analysis.—$C_{21}H_{32}N_2O_3S_2$. Calculated: C, 59.40%; H, 7.60%. Found: C, 59.7%; H, 8.0%.

EXAMPLE 10

Tablets which corresponded to the following formula were prepared:

D-N-methyl-N-(α-methyl-β-phenylethyl)-2-furyl-methylamine: 25 mg.

Excipient, q.s. 1 tablet.

EXAMPLE 11

Tablets which corresponded to the following formula were prepared:

D-N-methyl-N-(α-methyl-β-phenylethyl)-2-furyl-methylamine cyclohexyl sulphamate: 40 mg.
Excipient, q.s. 1 tablet.

EXAMPLE 12

Tablets which corresponded to the following formula were prepared:

D-N-methyl-N-(α-methyl-β-phenylethyl)-2-thienyl-methylamine cyclohexyl sulphamate: 10 mg.
Excipient, q.s. 1 tablet.

EXAMPLE 13

Tablets which corresponded to the following formula were prepared:

D-N-methyl-N-(α-methyl-β-phenylethyl)-3-thienyl-methylamine cyclohexyl sulphamate: 25 mg.
Excipient, q.s. 1 tablet.

We claim:

1. A compound selected from the group consisting of a compound of the general formula:

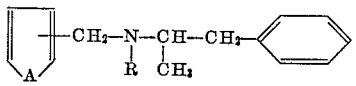

(I)

in which A represents an atom selected from the group consisting of oxygen and sulphur atoms and R represents a member selected from the group consisting of a hydrogen atom and an alkyl radical having no more than 3 carbon atoms, and their pharmaceuticaly accepted acid addition salts or mixtures thereof.

2. A compound selected from the group consisting of a substituted furyl-methylamine of the general formula:

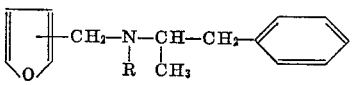

in which R represents a member selected from the group consisting of a hydrogen atom and an alkyl radical having no more than 3 carbon atoms, and their pharmaceutically accepted acid addition salts and mixtures thereof.

3. A compound selected from the group consisting of D-N - methyl - N - (α-methyl - β - phenylethyl)-2-furyl-methylamine, and its pharmaceutically accepted acid addition salts or mixtures thereof.

4. The cyclohexyl sulphamate of D-N - methyl - N-(α-methyl-β-phenylethyl)-2-furyl-methylamine.

5. A compound selected from the group consisting of substituted thienyl-methylamine of the general formula:

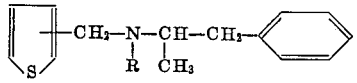

in which R represents a member selected from the group consisting of a hydrogen atom and an alkyl radical having no more than 3 carbon atoms, and their pharmaceutically accepted acid addition salts or mixtures thereof.

6. A compound selected from the group consisting of D-N - methyl - N - (α-methyl - β - phenylethyl)-2-thienyl-methylamine, and its pharmaceutically accepted acid addition salts or mixtures thereof.

7. The cyclohexyl sulphamate of D-N - methyl-N-(α-methyl-β-phenylethyl)-2-thienyl-methylamine.

8. A compound selected from the group consisting of D-N - methyl - N - (α-methyl - β - phenylethyl)-3-thienyl-methylamine, and its pharmaceutically accepted acid addition salts or mixtures thereof.

9. The cyclohexyl sulphamate of D-N - methyl-N-(α-methyl-β-phenylethyl)-3-thienyl-methylamine.

References Cited

Alles, et al., J. Pharm. & Expt. Therap., vol. 72; p. 265 (1941).
Icke. Org. Syntheses, vol. 25; pp. 89–91 (1945).
Billman et al., Synthetic Methods, vol. 13; p. 77 (1959).
Edgerton et al., J. of the Am. Pharm. Assn. Sci. Ed. 48 (1959).
Walter et al., Helr. Chim. Acta., vol. 44; p. 1546 (1961).
Fieser et al., Adv. Org. Chem., 1962 pp. 493–494.
Morrison et al., Org. Chem., 1965 pp. 553–555.

JOHN D. RANDOLPH, *Primary Examiner.*

WALTER A. MODANCE, *Examiner.*

C. M. SHURKO, *Assistant Examiner.*